United States Patent
Li et al.

(10) Patent No.: US 7,201,977 B2
(45) Date of Patent: Apr. 10, 2007

(54) ANTI-FERROMAGNETICALLY COUPLED GRANULAR-CONTINUOUS MAGNETIC RECORDING MEDIA

(75) Inventors: Shaoping Li, Naperville, IL (US); Kaizhong Gao, Eden Prairie, MN (US); Lei Wang, Apple Valley, MN (US); Wenzhong Zhu, Woodbarry, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 160 days.

(21) Appl. No.: 10/806,114

(22) Filed: Mar. 23, 2004

(65) Prior Publication Data

US 2005/0214585 A1    Sep. 29, 2005

(51) Int. Cl.
*G11B 5/66* (2006.01)

(52) U.S. Cl. .................. 428/829; 428/830

(58) Field of Classification Search .............. None
See application file for complete search history.

(56) References Cited

U.S. PATENT DOCUMENTS

| | | | |
|---|---|---|---|
| 5,723,978 A | | 3/1998 | Inomata et al. |
| 6,280,813 B1 | | 8/2001 | Carey et al. |
| 6,383,668 B1 * | | 5/2002 | Fullerton et al. ........... 428/831 |
| 6,420,058 B1 | | 7/2002 | Haratami et al. |
| 6,468,670 B1 | | 10/2002 | Ikeda et al. |
| 6,635,367 B2 * | | 10/2003 | Igarashi et al. ............ 428/828 |
| 6,773,834 B2 * | | 8/2004 | Do et al. .................. 428/828 |
| 6,777,112 B1 * | | 8/2004 | Girt et al. ................. 428/828 |
| 2002/0098390 A1 * | | 7/2002 | Do et al. ............... 428/694 TS |
| 2002/0136929 A1 * | | 9/2002 | Oikawa et al. ......... 428/694 TM |
| 2004/0086753 A1 * | | 5/2004 | Inomata ............... 428/694 TM |

* cited by examiner

*Primary Examiner*—Kevin M. Bernatz
(74) *Attorney, Agent, or Firm*—McDermott Will & Emery LLP (57) ABSTRACT

An anti-ferromagnetically coupled, granular-continuous ("AFC-GC") magnetic recording medium having increased thermal stability, writability, and signal-to-medium noise ratio ("SMNR"), comprising a layer stack including, in sequence from a surface of a non-magnetic substrate:
  (a) a continuous ferromagnetic stabilizing layer;
  (b) a non-magnetic spacer layer; and
  (c) a granular ferromagnetic recording layer;
wherein:
  (i) the continuous ferromagnetic stabilizing and granular ferromagnetic recording layers are anti-ferromagnetically coupled across the non-magnetic spacer layer, the amount of anti-ferromagnetic coupling preselected to ensure magnetic relaxation after writing;
  (ii) lateral interactions in the granular, ferromagnetic recording layer are substantially completely eliminated or suppressed; and
  (iii) the exchange coupling strength in the continuous, ferromagnetic stabilizing layer is preselected to be slightly larger than the strength of the anti-ferromagnetic coupling provided by the non-magnetic spacer layer to thereby enhance thermal stability of the recording bits.

24 Claims, 4 Drawing Sheets

ANTI-FERROMAGNETICALLY COUPLED GRANULAR-CONTINUOUS MAGNETIC RECORDING MEDIA

CROSS-REFERENCE TO RELATED APPLICATION

This application contains subject matter related to subject matter disclosed in co-pending, commonly assigned application Ser. No. 09/971,693 filed Oct. 9, 2001.

FIELD OF THE INVENTION

The present invention relates to high recording density (areal recording density) magnetic recording media exhibiting enhanced thermal stability and increased signal-to-medium noise ratio ("SMNR"). The invention finds particular utility in the form of hard disks such as employed in high areal recording density magnetic data/information storage and retrieval devices and systems.

BACKGROUND OF THE INVENTION

Magnetic recording ("MR") media and devices incorporating such media are widely employed in various applications, particularly in the computer industry for data/information storage and retrieval applications, typically in disk form. Conventional magnetic thin-film media, wherein a fine-grained polycrystalline magnetic alloy layer serves as the active recording medium layer, are generally classified as "longitudinal" or "perpendicular", depending upon the orientation of the magnetizations of the grains of magnetic material.

Figure 1:
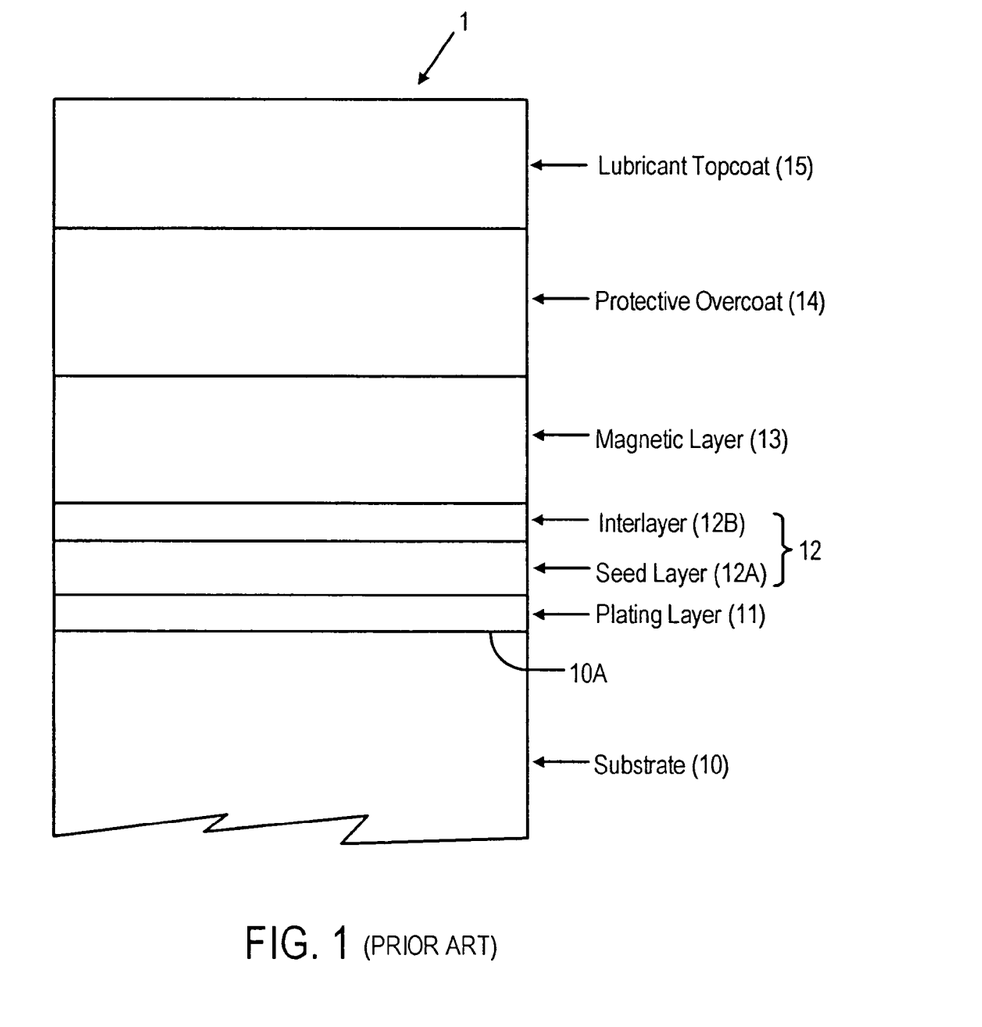
FIG. 1 schematically illustrates, in simplified, cross-sectional view, a portion of a conventional longitudinal-type magnetic recording medium.

A conventional longitudinal recording, hard disk-type magnetic recording medium 1 commonly employed in computer-related applications is schematically illustrated in FIG. 1, and comprises a substantially rigid, non-magnetic metal substrate 10, typically of aluminum (Al) or an aluminum-based alloy, such as an aluminum-magnesium (Al—Mg) alloy, having sequentially deposited or otherwise formed on a surface 10A thereof a plating layer 11, such as of amorphous nickel-phosphorus (Ni—P); a bi-layer 12 comprised of a seed layer 12A of an amorphous or fine-grained material, e.g., a nickel-aluminum (Ni—Al) or chromium-titanium (Cr—Ti) alloy, and a polycrystalline underlayer 12B, typically of Cr or a Cr-based alloy; a magnetic recording layer 13, e.g., of a cobalt (Co)-based alloy with one or more of platinum (Pt), Cr, boron (B), etc.; a protective overcoat layer 14, typically containing carbon (C), e.g., diamond-like carbon ("DLC"); and a lubricant topcoat layer 15, e.g., of a perfluoropolyether. Each of layers 10–14 may be deposited by suitable physical vapor deposition ("PVD") techniques, such as sputtering, and layer 15 is typically deposited by dipping or spraying.

In operation of medium 1, the magnetic layer 13 is locally magnetized by a write transducer, or write "head", to record and thereby store data/information therein. The write transducer or head creates a highly concentrated magnetic field which alternates the media magnetization direction based on the bits of information to be stored. When the local magnetic field produced by the write transducer is greater than the coercivity of the material of the recording medium layer 13, the grains of the polycrystalline material at that location are magnetized. The grains retain their magnetization after the magnetic field applied thereto by the write transducer is removed. The direction of the magnetization matches the direction of the applied magnetic field. The magnetization of the recording medium layer 13 can subsequently produce an electrical response in a read transducer, or read "head", allowing the stored information to be read.

Efforts are continually being made with the aim of increasing the recording (areal) density, i.e., the bit density, or bits/unit area, and signal-to-medium noise ratio ("SMNR") of the magnetic media. In this regard, so-called "perpendicular" recording media have been found to be superior to the more conventional "longitudinal" media in achieving very high bit densities. In perpendicular magnetic recording media, residual magnetization is formed in a direction perpendicular to the surface of the magnetic medium, typically a layer of a magnetic material on a suitable substrate. Very high linear recording densities are obtainable by utilizing a "single-pole" magnetic transducer or "head" with such perpendicular magnetic media.

Efficient, high bit density recording utilizing a perpendicular magnetic medium requires interposition of a relatively thick (as compared with the magnetic recording layer), magnetically "soft" underlayer ("SUL") layer, i.e., a magnetic layer having a relatively low coercivity of about 2–150 Oe, such as of a NiFe alloy (Permalloy), between the non-magnetic substrate, e.g., of glass, aluminum (Al) or an Al-based alloy, and the magnetically "hard" recording layer having relatively high coercivity of several kOe, typically about 4–10 kOe, e.g., of a cobalt-based alloy (e.g., a Co—Cr alloy such as CoCrPtB) having pendicular anisotropy. The magnetically soft underlayer serves to guide magnetic flux emanating from the head through the hard, perpendicular magnetic recording layer.

Figure 2:
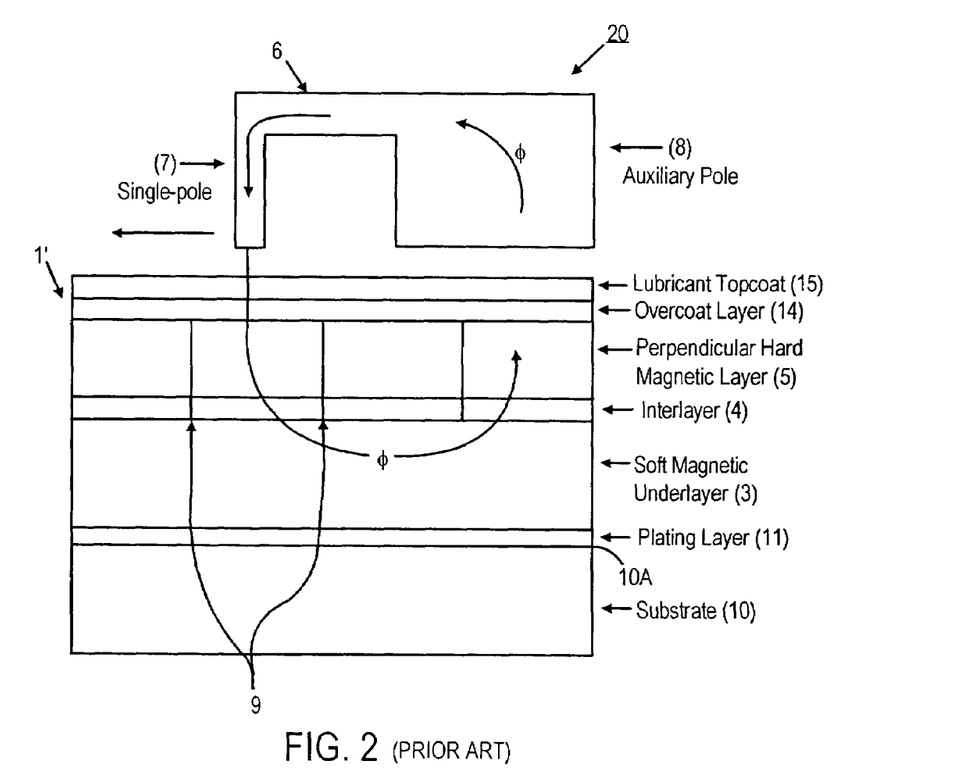
FIG. 2 schematically illustrates, in simplified, cross-sectional view, a portion of a magnetic recording, storage, and retrieval system comprised of a conventional perpendicular-type magnetic recording medium and a single-pole transducer head.

A typical perpendicular recording system 20 utilizing a magnetic medium 1' with a relatively thick soft magnetic underlayer, a relatively thin hard perpendicular magnetic recording layer, and a single-pole head, is illustrated in FIG. 2, wherein reference numerals 10, 11, 3, 4, and 5, respectively, indicate a non-magnetic substrate having a surface 10A, an adhesion layer (optional), a soft magnetic underlayer, at least one non-magnetic interlayer, and at least one perpendicular hard magnetic recording layer. Reference numerals 7 and 8, respectively, indicate the single and auxiliary poles of a single-pole magnetic transducer head 6. The relatively thin interlayer 4 (also referred to as an "intermediate" layer), comprised of one or more layers of non-magnetic materials, serves to (1) prevent magnetic interaction between the soft underlayer 3 and the at least one magnetically hard recording layer 5 and (2) promote, desired microstructural and magnetic properties of the at least one hard recording layer.

As shown by the arrows in the figure indicating the path of the magnetic flux $\phi$, flux $\phi$ is seen as emanating from single pole 7 of single-pole magnetic transducer head 6, entering and passing through the at least one vertically oriented, hard magnetic recording layer 5 in the region below single pole 7, entering and traveling within soft magnetic underlayer 3 for a distance, and then exiting from the soft magnetic underlayer and passing through the at least one perpendicular hard magnetic recording layer 5 in the region below auxiliary pole 8 of single-pole magnetic transducer head 6. The direction of movement of perpendicular magnetic medium 1' past transducer head 6 is indicated in the figure by the arrow above medium 1'.

With continued reference to FIG. 2, vertical lines 9 indicate grain boundaries of polycrystalline layers 4 and 5 of the layer stack constituting medium 1'. Since magnetically hard main recording layer 5 is epitaxially formed on interlayer 4, the grains of each polycrystalline layer are of substantially the same width (as measured in a horizontal direction) and in vertical registry (i.e., vertically "correlated" or aligned).

Completing the layer stack is a protective overcoat layer 14, such as of a diamond-like carbon (DLC), formed over hard magnetic layer 5, and a lubricant topcoat layer 15, such as of a perfluoropolyether material, formed over the protective overcoat layer.

As indicated supra, efforts are continually being made with the aim of increasing the recording (areal) density, i.e., the bit density, or bits/unit area, and signal-to-medium noise ratio ("SMNR") of the magnetic media. For example, the SMNR may be increased by reducing the grain size of the recording media, as by utilization of appropriately selected seed and underlayer structures and materials, by reduction of the thickness of the magnetic recording layer, and by a novel reactive deposition (oxidation) process. However, severe difficulties are encountered when the bit density of longitudinal media is increased above about 100–180 Gb/in$^2$ in order to form ultra-high recording density media, such as thermal instability, when the necessary reduction in grain size exceeds the superparamagnetic limit. Such thermal instability can, inter alia, reduce and cause undesirable decay of the output signal of hard disk drives, and in extreme instances, result in total data loss and collapse of the magnetic bits.

One proposed solution to the problem of thermal instability arising from the very small grain sizes associated with ultra-high recording density magnetic recording media, including that presented by the superparamagnetic limit, is to increase the crystalline anisotropy, thus the coercivity of the M-H loop of the media, in order to compensate for the smaller grain sizes. However, this approach is limited by the field provided by the recording head.

Another proposed solution to the problem of thermal instability of very fine-grained magnetic recording media is to provide stabilization via ferromagnetic or anti-ferromagnetic coupling of the recording layer with another ferromagnetic layer. In this regard, it has been recently proposed (E. N. Abarra et al., IEEE Conference on Magnetics, Toronto, April 2000) to provide a stabilized magnetic recording medium comprised of at least a pair of ferromagnetic layers (e.g., CoCrPtB layers) which are anti-ferromagnetically-coupled ("AFC") by means of an interposed thin, non-magnetic spacer layer. The coupling is presumed to increase the effective volume of each of the magnetic grains, thereby increasing their stability; the coupling strength between the ferromagnetic layer pairs being a key parameter in determining the increase in stability.

Figure 3A:
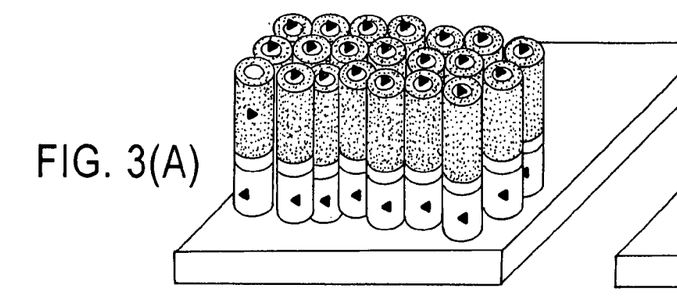
FIGS. 3(A)–3(D), respectively, schematically illustrate, in simplified perspective view, conventional anti-ferromagnetically coupled (AFC) magnetic recording media in longitudinal, longitudinal "tilted", perpendicular "tilted", and perpendicular configurations.
Figure 3B:
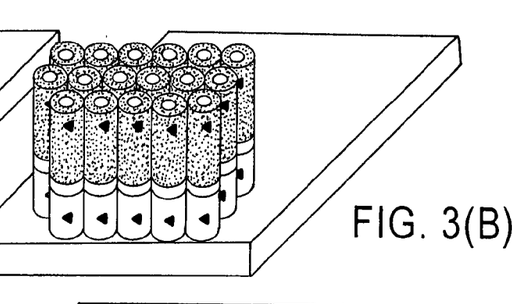
Figure 3C:
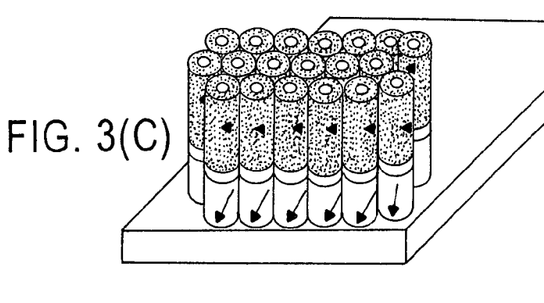
Figure 3D:
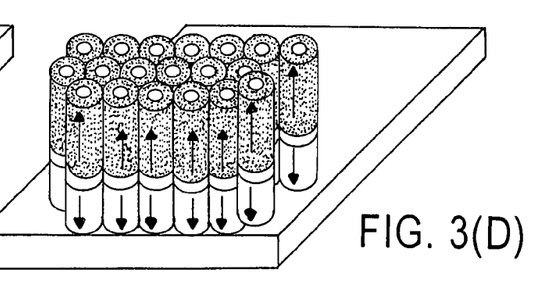

Referring to FIGS. 3(A)–3(D), illustrated therein, in simplified, schematic perspective view, are several possible magnetization configurations of conventional AFC media, wherein: FIG. 3(A) illustrates a longitudinal medium, wherein the direction of the magnetic moments of each of the grains of both of the anti-ferromagnetically coupled layers is aligned parallel to the substrate surface; FIG. 3(B) illustrates a longitudinal "tilted" medium, wherein the alignment direction of the magnetic moments of each of the grains of one of the anti-ferromagnetically coupled layers (illustratively, the upper layer) is tilted at an angle with respect to the substrate; FIG. 3(C) illustrates a perpendicular "tilted" medium, wherein the alignment direction of the magnetic moments of each of the grains of each of the anti-ferromagnetically coupled layers is tilted at an angle with respect to the substrate; and FIG. 3(D) illustrates a perpendicular medium, wherein the direction of the magnetic moments of each of the grains of both of the anti-ferromagnetically coupled layers is aligned normal to the substrate surface.

A significant drawback is associated with each of the illustrated types or configurations of conventional AFC media when each of the AFC-coupled ferromagnetic layers is granular, i.e., the in-plane grains are discontinuous in nature. As a result, the enhancement of thermal stability is somewhat moderated because the net enhancement is determined merely by the total volume of the grains which are coupled. Specifically, if the magnetic grains of the upper and lower magnetic layers are not grown in vertical alignment, or if they are not of equal size, the areas written in each of the pair of ferromagnetic layers may not coincide. In addition, the prior art approaches to media design fail to adequately take into account the significant effect on stability of magnetic recording media arising from interactions between magnetic grains.

Still another approach for achieving magnetic recording media exhibiting higher areal recording densities along with enhanced magnetic performance characteristics involves formation of media (so-called "CG" media) wherein a pair of vertically stacked magnetic layers, i.e., a so-called "granular" recording layer (wherein the magnetic grains are only weakly exchange coupled laterally) and a continuous layer (wherein the magnetic grains are strongly exchange coupled laterally) are ferromagnetically coupled together. In such CG media, while the entire continuous magnetic layer may couple with each grain in the granular magnetic layer, and thus the continuous magnetic layer will always provide additional strong local exchange coupling which does not aid in defining overall sharp magnetic transitions. More specifically, the enhancement of thermal stability afforded by the usual (i.e., ferromagnetically coupled) CG media is actually obtained with a sacrifice in SMNR or an increase in "jitter" noise.

Accordingly, there exists an acute need for improved methodology and structures for providing thermally stable, high areal recording density magnetic recording media, e.g., in the form of hard disks, with increased signal-to-media noise ratios (SMNRs), e.g., longitudinal media, which methodology and media structures can be implemented/fabricated at a manufacturing cost compatible with that of conventional manufacturing technologies for forming high areal recording density magnetic recording media.

The present invention, therefore, addresses and solves problems attendant upon forming high areal recording density magnetic recording media, e.g., in the form of hard disks, which media utilize magnetic or anti-ferromagnetic coupling between spaced-apart pairs of ferromagnetic layers for simultaneously enhancing thermal stability and increasing SMNR, while providing full compatibility with all aspects of conventional automated manufacturing technology. Moreover, manufacture and implementation of the present invention can be obtained at a cost comparable to that of existing technology.

DISCLOSURE OF THE INVENTION

An advantage of the present invention is further improvement and performance enhancement of magnetic recording media.

A key advantage of the present invention is an anti-ferromagnetically coupled, granular-continuous ("AFC-GC") magnetic recording medium which simultaneously exhibits increased thermal stability, writability, and signal-to-medium noise ratio ("SMNR").

Yet another advantage of the present invention is an anti-ferromagnetically coupled, granular-continuous ("AFC-GC") magnetic recording medium which can be fabricated as longitudinal, "tilted" longitudinal, perpendicular, and "tilted" perpendicular media types.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to an aspect of the present invention, the foregoing and other advantages are obtained in part by an anti-ferromagnetically coupled, granular-continuous ("AFC-GC") magnetic recording medium simultaneously exhibiting increased thermal stability, writability, and signal-to-medium noise ratio ("SMNR"), comprising a layer stack including, in sequence from a surface of a non-magnetic substrate:

(a) a continuous ferromagnetic stabilizing layer;
(b) a non-magnetic spacer layer; and
(c) a granular ferromagnetic layer;
wherein:
  (i) the continuous ferromagnetic stabilizing layer and the granular ferromagnetic layer are anti-ferromagnetically coupled across the non-magnetic spacer layer, the amount of anti-ferromagnetic coupling preselected to ensure magnetic relaxation after writing;
  (ii) lateral interactions in the granular, ferromagnetic layer are substantially completely eliminated or suppressed; and
  (iii) the exchange coupling strength in the continuous, ferromagnetic stabilizing layer is preselected to be slightly larger than the strength of the anti-ferromagnetic coupling provided by the non-magnetic spacer layer to thereby enhance thermal stability of the recording bits.

According to embodiments of the present invention: the continuous ferromagnetic stabilizing layer is proximal the substrate and the granular ferromagnetic layer is distal the substrate, or the granular ferromagnetic layer is proximal the substrate and the continuous ferromagnetic stabilizing layer is distal the substrate; the continuous ferromagnetic stabilizing layer and the granular ferromagnetic layer each comprise a plurality of magnetic grains each having a magnetic moment; and the medium may assume different configurations, as follows:

(1) the magnetic moments of each of the magnetic grains of the continuous ferromagnetic stabilizing and granular ferromagnetic layers are aligned parallel to the surface of the substrate, and the medium is a longitudinal medium;

(2) the magnetic moments of each of the magnetic grains of the continuous ferromagnetic stabilizing layer are aligned parallel to the surface of the substrate, the magnetic moments of each of the magnetic grains of the granular ferromagnetic layer are aligned at an angle to the surface of the substrate, and the medium is a longitudinal "tilted" medium;

(3) the magnetic moments of each of the magnetic grains of the continuous ferromagnetic stabilizing and granular ferromagnetic layers are aligned normal to the surface of the substrate, and the medium is a perpendicular medium; and (4) the magnetic moments of each of the magnetic grains of the continuous ferromagnetic stabilizing and granular ferromagnetic layers are aligned at an angle to the surface of the substrate, and the medium is a perpendicular "tilted" medium.

Embodiments of the present invention include those wherein: the continuous ferromagnetic stabilizing layer (a) comprises a material selected from the group consisting of: Co-based alloys, Fe-based alloys, and multi-layer superlattice structures, e.g., a CoCrPtX alloy, where X is at least one element selected from the group consisting of: Pt, Fe, Tb, Ta, Tb, B, C, Mo, V, Nb, W, Zr, Re, Ru, Ag, Hf, Ir, Si, and Y; the non-magnetic spacer layer comprises a material selected from the group consisting of: Ru, Rh, Ir, Cr, Cu, and alloys thereof, e.g., Ru or CrMo; and the granular ferromagnetic layer comprises a CoCrPt—X' material, where X' is selected from the group consisting of: oxides, nitrides, and carbides, e.g., CoCrPt—$SiO_2$, CoCrPt—$SiN_x$, and CoCrPt—SiC, wherein adjacent magnetic grains are substantially magnetically isolated from each other.

According to a preferred embodiment of the present invention, the continuous ferromagnetic stabilizing layer (a) is from about 10 to about 30 nm thick; the non-magnetic spacer layer (b) is up to about 2 nm thick; the granular, ferromagnetic layer (c) is from about 15 to about 60 nm thick; and the medium supports areal recording densities from about 150 to about 350 $Gbit/in^2$.

According to another preferred embodiment of the present invention, the continuous ferromagnetic stabilizing layer (a) is from about 10 to about 20 nm thick; the non-magnetic spacer layer (b) is up to about 2 nm thick, e.g., 0.5–2.0 nm thick; the granular ferromagnetic layer (c) is from about 10 to about 30 nm thick; and the medium supports areal recording densities from about 150 to about 350 $Gbit/in^2$.

Further preferred embodiments of the present invention include those wherein the medium is a perpendicular medium and the layer stack further comprises:

(d) a magnetically soft underlayer from about 100 to about 500 nm thick and comprised of at least one soft magnetic material selected from the group consisting of: Ni, NiFe (Permalloy), Co, CoZr, CoZrCr, CoZrNb, CoFeZrNb, CoFe, Fe, FeN, FeSiAl, FeSiAlN, FeCoB, and FeCoC.

According to still further preferred embodiments of the invention, the layer stack further comprises:

(e) at least one seed layer below the continuous ferromagnetic stabilizing layer, comprised of at least one material selected from the group consisting of: Ti, Ni, Cu, Mg, CoZr, FeHfN, Ag, Cr, and SiN.

Yet further embodiments of the present invention include those wherein the medium is a longitudinal medium and the layer stack further includes:

(f) at least one non-magnetic interlayer, comprised of at least one non-magnetic material selected from the group consisting of: Ru, TiCr, Ru/CoCrPt, and RuCr/CoCrPt.

According to embodiments of the present invention, the non-magnetic substrate comprises a non-magnetic material selected from the group consisting of: Al, Al-based alloys, NiP-plated Al, other non-magnetic metals, other non-magnetic metal alloys, glass, ceramics, glass-ceramics, polymers, and laminates and composites thereof; and the medium further comprises:

(g) a protective overcoat layer on the granular ferromagnetic recording layer, e.g., comprised of a carbon-based material; and (h) a lubricant topcoat layer on the protective overcoat layer, e.g., comprised of a perfluoropolyether material.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which the various features are not necessarily drawn to scale but rather are drawn as to best illustrate the pertinent features and the same reference numerals are employed throughout for designating similar features, wherein.

DESCRIPTION OF THE INVENTION

The present invention is based upon recognition by the inventors that very high areal recording density magnetic recording media of various types, each exhibiting improved thermal stability, writability, and signal-to-medium noise ratio (SMNR) can be reliably and controllably provided by a layer stack comprising a pair of vertically spaced-apart ferromagnetic layers which are anti-ferromagnetically coupled ("AFC") together across a non-magnetic spacer layer, wherein one layer of the pair is a continuous, ferromagnetic stabilizing layer and the other layer of the pair is a granular, i.e., discontinuous, ferromagnetic layer. Moreover, the invention advantageously affords flexible design of the layer stack in that either the continuous, ferromagnetic stabilizing layer or the granular ferromagnetic layer may be proximate the substrate surface, with the other type of ferromagnetic layer distal the substrate surface.

Media according to the present invention are advantageously capable of being formed in a variety of configurations, as for example, illustrated in the above-described FIGS. 3(A)–3(B). Specifically, inasmuch as the continuous, ferromagnetic stabilizing layer and the granular, ferromagnetic layer each comprise a plurality of magnetic grains each having a magnetic moment, differently configured media may be fabricated, as follows:

Configuration (1): the magnetic moments of each of the magnetic grains of the continuous ferromagnetic stabilizing and granular ferromagnetic layers are aligned parallel to the surface of the substrate, and the medium is a longitudinal medium;

Configuration (2): the magnetic moments of each of the magnetic grains of the continuous ferromagnetic stabilizing layer are aligned parallel to the surface of the substrate, the magnetic moments of each of the magnetic grains of the granular ferromagnetic layer are aligned at an angle to the surface of the substrate, and the medium is a longitudinal "tilted" medium;

Configuration (3): the magnetic moments of each of the magnetic grains of the continuous ferromagnetic stabilizing and granular ferromagnetic layers are aligned normal to the surface of the substrate, and the medium is a perpendicular medium; and Configuration (4): the magnetic moments of each of the magnetic grains of the continuous ferromagnetic stabilizing and granular ferromagnetic layers are aligned at an angle to the surface of the substrate, and the medium is a perpendicular "tilted" medium.

In addition, media according to the invention include continuous and granular magnetic layers and non-magnetic spacer layers composed, structured, and of appropriate thicknesses to provide the following:

(1) the continuous ferromagnetic stabilizing layer and the granular ferromagnetic layer are anti-ferromagnetically coupled across the non-magnetic spacer layer, the amount of anti-ferromagnetic coupling being preselected to ensure magnetic relaxation after writing;

(2) lateral interactions in the granular, ferromagnetic layer are substantially completely eliminated or suppressed; and (3) the exchange coupling strength in the continuous ferromagnetic stabilizing layer is preselected to be slightly larger than the strength of the anti-ferromagnetic coupling provided by the non-magnetic spacer layer to thereby enhance thermal stability of the recording bits.

The invention therefore affords several advantages not obtainable according to the conventional art, including, inter alia, enhanced thermal stability, writability, and SMNR, as well as reliable, controllable, and cost-effective formation of very high areal density magnetic recording media utilizing conventional manufacturing techniques and instrumentalities, e.g., sputtering techniques and apparatus.

The underlying rationale/basis of the invention is as follows: in conventional, i.e., ferromagnetically-coupled granular-continuous ("FC-GC") media, the strength of the coupling between the continuous and granular ferromagnetic layers is so strong that they are always coupled coherently, whether in the static or dynamic state. By contrast, in the anti-ferromagnetically coupled granular-continuous ("AFC-GC") media fabricated according to the present invention, the strength of the anti-ferromagnetic coupling (AFC) is as strong as the ferromagnetic coupling (FC) in the conventional FC-GC media in the static case. However, the ferromagnetic continuous and granular layers in the AFC-GC media according to the present invention can be de-coupled in dynamic situations.

Stated differently, FC-GC media have strong ferromagnetic exchange coupling in both static and dynamic situations. As a consequence, while overall static thermal stability may be improved because of the strong exchange coupling in the static situation, recording performance (i.e., the dynamic case) degrades because of the strong exchange coupling in the dynamic situation. Thus, FC-GC media may exhibit improved thermal stability but degraded recording performance, e.g., SMNR.

By contrast, AFC-GC media according to the present invention have very strong anti-ferromagnetic coupling (AFC) only in the static situation. Therefore, thermal stability is enhanced in the static situation and since the AFC in the dynamic situation is small or almost non-existent, as a result the recording performance, e.g., SMNR, is improved in the dynamic situation as well.

The present invention provides new types of AFC recording media which provide simultaneous improvement of thermal stability and recording performance, comprised of anti-ferromagnetically coupled continuous and granular ferromagnetic layers, in contrast with conventional AFC media wherein each of the AFC coupled layers is a granular ferromagnetic layer.

Figure 4:
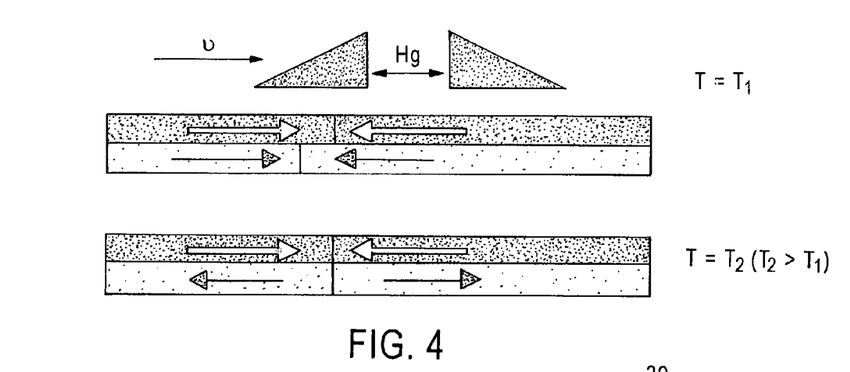
FIG. 4 schematically illustrates writing and subsequent relaxation processes occurring in AFC magnetic recording media.

Referring now to FIG. 4, schematically illustrated therein are writing and subsequent relaxation processes occurring in AFC-GC magnetic recording media according to the present invention, wherein υ=velocity of media (e.g., disk) movement and $H_g$=magnetic field in the gap. In such media, if the head field is not homogeneous, e.g., in the case where there is a field gradient, or the two anti-ferromagnetically coupled layers have different switching fields, during writing the instantaneously defined transitions in the granular layer (illustratively the upper layer in FIG. 4) and the continuous layer (illustratively the lower layer in FIG. 4) are physically located at different down-track locations. This phenomenon occurs because the switching fields during writing (i.e., $T=T_1$) of the continuous and granular ferromagnetic layers are significantly different and the two layers are anti-ferromagnetically coupled together. Upon subsequent relaxation of the AFC-GC media, i.e., at $T=T_2$ (where $T_2>T_1$), the subsequently defined transitions are at the same physical location.

An important characteristic of such unique phase-shifted writing is that the final bit transition sharpness and its "jitter" behavior (i.e., transition parameter or length) are primarily determined by the microstructure of the thicker granular (recording) layer. Stated differently, the strength of exchange coupling between the grains in the continuous ferromagnetic layer has little or no influence on the sharpness of the transition parameter of the granular ferromagnetic layer, since the magnetization reversal processes in each of the layers are substantially independent of each other, i.e., the inventive AFC-GC media can be considered as dynamically de-coupled.

In practice, the final bit transition location in the continuous ferromagnetic stabilization layer will be post-aligned with the written transition location in the granular ferromagnetic layer through the unique magnetization process schematically illustrated in the lower view of FIG. 4, i.e., at $T=T_2$ (where $T_2>T_1$). In this regard, it is noteworthy that such unique phase-shifted writing process has not heretofore been observed with conventional AFC media.

A novel, advantageous aspect of AFC-GC media according to the present invention is that the media are dynamically de-coupled if the writing field has a certain field gradient. Further, it should be noted that the temperature is always uniform and the continuous ferromagnetic layer always has a large switching volume. As a consequence, the overall thermal stability of the AFC-GC media according to the invention will always be enhanced, vis-à-vis conventional AFC media (wherein each ferromagnetic layer is granular). The present invention, therefore, has as an underlying goal, to form a 2-layer recording medium in the form of a spring-like system which effectively "locks" the recorded magnetization directions of the memory bits in a uniform temperature environment when utilizing an inhomogeneous writing field.

The above-described phase-shifted writing and subsequent relaxation process ensures the overall transition sharpness in the inventive AFC-GC media, leading to simultaneous attainment of very small media noise and better SMNR performance. By contrast, in the conventional, ferromagnetically coupled GC (FC-GC) media, the continuous and granular layers are switched coherently in both spatial and time domains, since the ferromagnetic coupling is so strong as to effectively preclude occurrence of the inventive phase-shifted writing process. In addition, according to the invention, the switching fields or coercivities of the continuous, ferromagnetic stabilization layer and the granular ferromagnetic layer can be tailored to track (i.e., follow) the head field distribution so that the overall writability of the media is enhanced.

Figure 5:
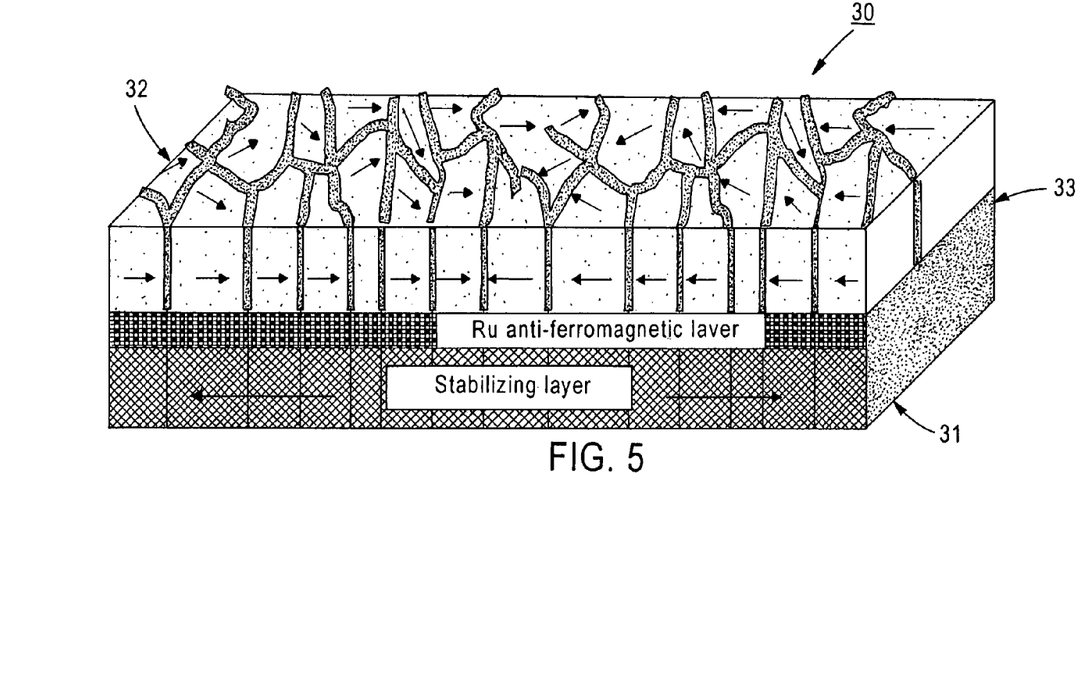
FIG. 5 schematically illustrates, in simplified perspective view, an AFC-GC medium in a longitudinal configuration, according to an embodiment of the present invention.

Adverting to FIG. 5, schematically illustrated therein, in simplified perspective view, is an AFC-GC medium 30 according to an illustrative, but not limitative, embodiment of the present invention, in which the substrate, seed, magnetically soft underlayer, interlayer(s), protective overcoat, and lubricant topcoat layer are not shown for illustrative simplicity, but which are fully analogous to the substrate, seed, magnetically soft underlayer, interlayer(s), protective overcoat, and lubricant topcoat layers shown in FIGS. 1–2 and respectively identified by reference numerals 10, 12A, 3, 4, 14, and 15.

As illustrated, medium 30 comprises a "sandwich" or stacked layer structure comprised of a continuous ferromagnetic stabilizing layer 31 and a granular ferromagnetic layer 32 vertically separated by a non-magnetic spacer layer 33, wherein each of layers 31–33 is composed, structured, and of appropriate thicknesses such that:

(1) the continuous ferromagnetic stabilizing layer 31 and the granular ferromagnetic layer 32 are anti-ferromagnetically coupled across the non-magnetic spacer layer 33, wherein a preselected amount of anti-ferromagnetic coupling is present between the continuous continuous ferromagnetic stabilizing layer 31 and the granular ferromagnetic layer 32 to ensure magnetic relaxation after writing;

(2) lateral interactions in the granular ferromagnetic layer 32 are substantially completely eliminated or suppressed; and (3) the exchange coupling strength in the continuous ferromagnetic stabilizing layer 31 is preselected to be slightly larger than the strength of the anti-ferromagnetic coupling provided by the non-magnetic spacer layer 33 to thereby enhance thermal stability of the recording bits.

The invention admits of flexibility in media design. Therefore, according to an embodiment of the invention, the continuous ferromagnetic stabilizing layer 31 is a lower layer of the sandwich structure (or layer stack) and is positioned nearer (i.e., proximal) substrate 10 and the granular ferromagnetic layer 32 is an upper layer located further from (i.e., distal) substrate 10; whereas, according to another embodiment of the invention, the granular ferromagnetic layer 32 is a lower layer, i.e., proximal substrate 10 and the continuous ferromagnetic stabilizing layer 31 is an upper layer, i.e., distal substrate 10. In either instance, the continuous ferromagnetic stabilizing layer 31 and the granular ferromagnetic layer 32 each comprise a plurality of magnetic grains each having a magnetic moment; and either embodiment of medium 30 may assume different configurations, as follows:

(1) the magnetic moments of each of the magnetic grains of the continuous ferromagnetic stabilizing layer 31 and granular ferromagnetic layer 32 are aligned parallel to the surface of substrate 10, and medium 30 is a longitudinal medium;

(2) the magnetic moments of each of the magnetic grains of the continuous ferromagnetic stabilizing layer 31 are aligned parallel to the surface of substrate 10, the magnetic moments of each of the magnetic grains of the granular ferromagnetic layer 32 are aligned at an angle to the surface of substrate 10, and medium 30 is a longitudinal "tilted" medium;

(3) the magnetic moments of each of the magnetic grains of the continuous ferromagnetic stabilizing layer 31 and granular ferromagnetic layer 32 are aligned normal to the surface of substrate 10, and medium 30 is a perpendicular medium; and (4) the magnetic moments of each of the magnetic grains of the continuous ferromagnetic stabilizing layer 31 and granular ferromagnetic layer 32 are aligned at an angle to the surface of substrate 10, and medium 30 is a perpendicular "tilted" medium.

The continuous ferromagnetic stabilizing layer 31 may be from about 2 to about 30 nm thick, and comprised of a material selected from the group consisting of: Co-based alloys, Fe-based alloys, and multi-layer superlattice structures, e.g., a CoCrPtX alloy, where X is at least one element selected from the group consisting of: Pt, Fe, Tb, Ta, Tb, B, C, Mo, V, Nb, W, Zr, Re, Ru, Ag, Hf, Ir, Si, and Y; the non-magnetic spacer layer 33 may be from about 0.5 to about 3 nm thick, and comprised of a material selected from the group consisting of: Ru, Rh, Ir, Cr, Cu, and alloys thereof, e.g., Ru or CrMo; and the granular ferromagnetic layer 32 may be from about 5 to about 60 nm thick, and comprised of a CoCrPt—X' material, where X' is selected from the group consisting of: oxides, nitrides, and carbides, e.g., CoCrPt—$SiO_2$, CoCrPt—$SiN_x$, and CoCrPt—SiC, and adjacent magnetic grains are substantially magnetically isolated from each other.

By way of illustration, but not limitation, according to a particular embodiment of the present invention, the continuous, ferromagnetic stabilizing layer 31 is from about 10 to about 30 nm thick and comprised of CoCrPtB; the non-magnetic spacer layer 33 is up to about 2 nm thick (e.g., 0.5–2.0 nm thick) and comprised of Ru; the granular, ferromagnetic layer 32 is from about 15 to about 60 nm thick and comprised of CoCrPtB+$SiO_2$ (or other oxide, nitride, or carbide); and medium 30 supports areal recording densities from about 150 to about 350 Gbit/in$^2$.

In this embodiment, the oxides, nitrides, or carbides present in the granular ferromagnetic layer 32 provide essentially complete isolation of each magnetic grain therein. As a consequence, lateral interactions between the grains are substantially completely suppressed or eliminated. On the one hand, a certain amount of exchange coupling will be maintained in the continuous ferromagnetic stabilization layer 31 to ensure its relaxation after writing. (Typically, higher concentrations of Cr are provided at the grain boundaries to provide the desired exchange interactions among the magnetic grains). On the other hand, the strength of the desired exchange coupling and the thickness of the continuous ferromagnetic stabilization layer 31 are selected to enhance thermal stability of the recording bits. More specifically, the strength of exchange coupling in the continuous ferromagnetic stabilization layer 31 should be just slightly larger than the strength of anti-ferromagnetic coupling provided by the Ru non-magnetic spacer layer 33.

According to another particular embodiment of the present invention, the quasi-continuous, ferromagnetic stabilization layer 31 is from about 10 to about 20 nm thick and comprised of CoCrPtB; the non-magnetic spacer layer 33 is up to about 2 nm thick, e.g., 0.5–2.0 nm thick; the granular, ferromagnetic layer 32 is from about 10 to about 30 nm thick and comprised of CoCrPtB; and medium 30 supports areal recording densities from about 150 to about 350 Gbit/in$^2$.

The requirements for the continuous ferromagnetic stabilization layer 31 are summarized as follows:

(1) $(K_\mu V)_{continuous\ layer} > (K_\mu V)_{granular\ layer}$;

(2) sufficiently large exchange length or coupling strength between grains; and (3) sufficient inter-layer and anti-ferromagnetic exchange coupling between the continuous and granular ferromagnetic layers.

Further embodiments of the present invention include those wherein the medium 30 is a perpendicular medium and the layer stack further comprises a magnetically soft underlayer (analogous to layer 3 of conventional medium 1' shown in FIG. 2) from about 100 to about 500 nm thick, located within the layer stack below the continuous ferromagnetic stabilizing and granular ferromagnetic layers 31, 32, and comprised of at least one soft magnetic material selected from the group consisting of: Ni, NiFe (Permalloy), Co, CoZr, CoZrCr, CoZrNb, CoFeZrNb, CoFe, Fe, FeN, FeSiAl, FeSiAlN, FeCoB, and FeCoC.

Still further embodiments of the invention include those wherein the layer stack further comprises at least one seed layer from about 1 to about 30 nm thick, located in the layer stack below the continuous ferromagnetic stabilizing layer 31, analogous to layer 12A of conventional medium 1 shown in FIG. 1, and comprised of at least one material selected from the group consisting of: Ti, Ni, Cu, Mg, CoZr, FeHfN, Ag, Cr, and SiN.

When medium 30 is a longitudinal medium, the layer stack may further include at least one non-magnetic interlayer from about 0.6 to about 0.9 nm thick (analogous to layer 12B of conventional medium 1 shown in FIG. 1), comprised of at least one non-magnetic material selected from the group consisting of: Ru, TiCr, Ru/CoCrPt, and RuCr/CoCrPt.

The substrate (analogous to substrate 10 of conventional media 1 and 1' shown in FIGS. 1–2) is non-magnetic and typically comprised a non-magnetic material selected from the group consisting of: Al, Al-based alloys, NiP-plated Al, other non-magnetic metals, other non-magnetic metal alloys, glass, ceramics, glass-ceramics, polymers, and laminates and composites thereof. The thickness of the substrate is not critical; however, in the case of magnetic recording media intended for hard disk applications, substrate thickness must be sufficient to supply the necessary rigidity.

Finally, medium 30 typically includes a protective overcoat layer on the granular, ferromagnetic recording layer, e.g., comprised of a layer of a carbon-based material from about 2 to about 20 Å thick; and a lubricant topcoat layer on the protective overcoat layer, e.g., comprised of a perfluoropolyether material from about 2 to about 30 Å thick.

Each of the constituent layers of each of the embodiments of medium 30 according to the invention, except for the lubricant topcoat layer, may advantageously be deposited, or otherwise formed, by suitable, conventional physical vapor deposition (PVD) techniques, e.g., sputtering, and the lubricant topcoat layer may be readily formed as by conventional dipping or spraying techniques.

The present invention thus advantageously provides high quality, thermally stable, high areal recording density magnetic recording media which can provide improved thermal stability and signal-to-medium noise ratio (SMNR) via anti-ferromagnetic coupling (AFC) of a granular ferromagnetic layer with continuous ferromagnetic stabilization layer through a non-magnetic spacer layer to form AFC-GC media. In addition, such AFC-GC media offer another avenue for significantly reducing the grain size (<7–9 nm), such further reduction in grain size being difficult to achieve with conventional alloy-based media. Moreover, the inventive methodology can be practiced in a cost-effective mariner utilizing conventional manufacturing technology and equipment (e.g., sputtering technology/equipment) for automated, large-scale manufacture of magnetic recording media, such as hard disks. Finally, the invention is not limited to use with hard disks but rather is broadly applicable to the formation of thermally stable, high areal density magnetic recording media suitable for use in all manner of devices, products, and applications.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. An anti-ferromagnetically coupled, granular-continuous ("AFC-GC") magnetic recording medium, comprising a layer stack formed on a surface of a non-magnetic substrate and including:
   (a) a continuous ferromagnetic stabilizing layer;
   (b) a non-magnetic spacer layer contacting said ferromagnetic stabilizing layer; and
   (c) a granular ferromagnetic layer contacting said non-magnetic spacer layer, said granular ferromagnetic layer comprises a CoCrPt—X' material, where X' is selected from the group consisting of: oxides, nitrides, and carbides, and adjacent magnetic grains are substantially magnetically isolated from each other; wherein:
      (i) said continuous ferromagnetic stabilizing layer and said granular ferromagnetic layer are anti-ferromagnetically coupled across said non-magnetic spacer layer, the amount of anti-ferromagnetic coupling preselected to ensure magnetic relaxation after writing;
      (ii) lateral interactions in said granular, ferromagnetic recording layer are substantially completely eliminated or suppressed; and
      (iii) the exchange coupling strength in said continuous, ferromagnetic stabilizing layer is preselected to be larger than the strength of the anti-ferromagnetic coupling provided by the non-magnetic spacer layer to thereby enhance thermal stability of the recording bits.

2. The AFC-GC medium as in claim 1, wherein: said continuous ferromagnetic stabilizing layer is proximal said substrate and said granular ferromagnetic layer is distal said substrate.

3. The AFC-GC medium as in claim 1, wherein: said granular ferromagnetic layer is proximal said substrate and said continuous ferromagnetic stabilization layer is distal said substrate.

4. The AFC-GC medium as in claim 1, wherein: said continuous ferromagnetic stabilizing layer and said granular ferromagnetic layer each comprise a plurality of magnetic grains each having a magnetic moment.

5. The AFC-GC medium as in claim 4, wherein: the magnetic moments of each of said magnetic grains of said continuous ferromagnetic stabilizing and granular ferromagnetic layers are aligned parallel to said surface of said substrate, and said medium is a longitudinal medium.

6. The AFC-GC medium as in claim 4, wherein: the magnetic moments of each of said magnetic grains of said continuous ferromagnetic stabilizing layer are aligned parallel to said surface of said substrate the magnetic moments of each of said magnetic grains of said granular ferromagnetic layer are aligned at an angle to said surface of said substrate, and said medium is a longitudinal "tilted" medium.

7. The AFC-GC medium as in claim 4, wherein: the magnetic moments of each of said magnetic grains of said continuous ferromagnetic stabilizing and granular ferromagnetic layers are aligned normal to said surface of said substrate, and said medium is a perpendicular medium.

8. The AFC-GC medium as in claim 4, wherein: the magnetic moments of each of said magnetic grains of said continuous ferromagnetic stabilizing and granular ferromagnetic layers are aligned at an angle to said surface of said substrate, and said medium is a perpendicular "tilted" medium.

9. The AFC-GC medium as in claim 1, wherein: said continuous ferromagnetic stabilizing layer (a) comprises a material selected from the group consisting of: Co-based alloys, Fe-based alloys, and multi-layer superlattice structures.

10. The AFC-GC medium as in claim 9, wherein: said continuous ferromagnetic stabilizing layer (a) comprises a CoCrX alloy, where X is at least one element selected from the group consisting of: Pt, Fe, Tb, Ta, B, C, Mo, V, Nb, W, Zr, Re, Ru, Ag, Hf, Ir, Si, and Y.

11. The AFC-GC medium as in claim 1, wherein: said non-magnetic spacer layer (b) comprises a material selected from the group consisting of: Ru, Rh, Ir, Cr, Cu, and alloys thereof.

12. The AFC-GC medium as in claim 11, wherein: said non-magnetic spacer layer (b) comprises a material selected from the group consisting of: Ru and CrMo.

13. The AFC medium as in claim 1, wherein: said granular ferromagnetic layer (c) comprises a material selected from the group consisting of: $CoCrPt—SiO_2$, $CoCrPt—SiN_x$, and CoCrPt—SiC.

14. The AFC-GC medium as in claim 1, wherein: said continuous ferromagnetic layer (a) is from about 10 to about 30 nm thick; said non-magnetic spacer layer (b) is up to about 2 nm thick; said granular ferromagnetic layer (c) is from about 15 to about 60 nm thick; and the medium supports areal recording densities from about 150 to about 350 $gbit/in^2$.

15. The AFC-GC medium as in claim 1, wherein: said continuous ferromagnetic stabilizing layer (a) is from about 10 to about 20 nm thick;

said non-magnetic spacer layer (b) is up to about 2 nm thick;

said granular ferromagnetic (c) is from about 10 to about 30 nm thick;

and the medium supports areal recording densities from about 150 to about 350 gbit/in$^2$.

16. The AFC-GC medium as in claim 1, wherein said medium is a perpendicular medium and said layer stack further comprises:

(d) a magnetically soft underlayer.

17. The AFC-GC medium as in claim 16, wherein:

said magnetically soft underlayer (d) is from about 100 to about 500 nm thick and comprised of at least one soft magnetic material selected from the group consisting of: Ni, NiFe (permalloy), Co, CoZr, CoZrCr, CoZrNb, CoFeZrNb, CoFe, Fe, FeN, FeSiAl, FeSiAlN, FeCoB, and FeCoC.

18. The AFC-GC medium as in claim 1, wherein said layer stack further comprises:

(e) at least one seed layer below said continuous ferromagnetic stabilizing layer.

19. The AFC-GC medium as in claim 18, wherein:

said at least one seed layer (e) comprises at least one material selected from the group consisting of: Ti, Ni, Cu, Mg, CoZr, FeHfN, Ag, Cr, and SiN.

20. The AFC-GC medium as in claim 1, wherein said medium is a longitudinal medium and said layer stack further comprises:

(f) at least one non-magnetic interlayer.

21. The AFC-GC medium as in claim 20, wherein:

said at least one non-magnetic interlayer (f) comprises at least one non-magnetic material selected from the group consisting of: Ru, TiCr, Ru/CoCrPt, and RuCr/CoCrPt.

22. The AFC-GC medium as in claim 1, wherein:

said non-magnetic substrate comprises a non-magnetic material selected from the group consisting of: Al, Al-based alloys, NiP-plated Al, other non-magnetic metals, other non-magnetic metal alloys, glass, ceramics, glass-ceramics, polymers, and laminates and composites thereof.

23. The AFC-GC medium as in claim 1, further comprising:

(g) a protective overcoat layer on said granular, ferromagnetic recording layer; and (h) a lubricant topcoat layer on said protective overcoat layer.

24. The AFC-GC medium as in claim 23, wherein:

said protective overcoat layer (g) comprises a carbon-based material; and said lubricant topcoat layer (h) comprises a perfluoropolyether material.

* * * * *